(12) United States Patent
Hosaka

(10) Patent No.: US 11,285,555 B2
(45) Date of Patent: Mar. 29, 2022

(54) WIRE ELECTRICAL DISCHARGE MACHINING DEVICE

(71) Applicant: Sodick Co., Ltd., Kanagawa (JP)

(72) Inventor: Akio Hosaka, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 80 days.

(21) Appl. No.: 16/861,236

(22) Filed: Apr. 29, 2020

(65) Prior Publication Data

US 2020/0368836 A1    Nov. 26, 2020

(30) Foreign Application Priority Data

May 22, 2019    (JP) .............................. JP2019-095670

(51) Int. Cl.
*B23H 7/10*    (2006.01)
(52) U.S. Cl.
CPC ..................... *B23H 7/10* (2013.01)
(58) Field of Classification Search
None
See application file for complete search history.

(56) References Cited

U.S. PATENT DOCUMENTS

| 5,006,692 A  * | 4/1991 | Magara ................. B23H 7/102 219/69.12 |
| 10,010,957 B2 | 7/2018 | Inoue |
| 2016/0023291 A1* | 1/2016 | Inoue ..................... B23H 7/102 219/69.12 |

FOREIGN PATENT DOCUMENTS

| JP | H0547333 | 7/1993 |
| JP | 08099228 A * | 4/1996 |
| JP | H0899228 | 4/1996 |
| JP | 2004172015 | 6/2004 |
| JP | 2004172015 A * | 6/2004 |
| JP | 5783653 | 9/2015 |

* cited by examiner

*Primary Examiner* — Dana Ross
*Assistant Examiner* — Elizabeth M Sims
(74) *Attorney, Agent, or Firm* — JCIPRNET

(57) ABSTRACT

In a wire electrical discharge machining device, a wire electrode released from a wire bobbin can be supplied toward a wire electrical discharge machining portion without generating permanently bending or twisting. A first pulley, which receives a wire electrode fed out from a wire bobbin and delivers the wire electrode to the downstream side, is disposed to wind the wire electrode WE to a first delivery position of an outer peripheral portion opposite to a first reception position across a central portion in a radial direction and deliver the wire electrode WE downward. The first pulley is swingable in the horizontal direction with one end in the radial direction as a fulcrum. The swing fulcrum is disposed, in the width direction of the wire bobbin, within a range from one end to the other end in the width direction of the wire bobbin.

5 Claims, 8 Drawing Sheets

WIRE ELECTRICAL DISCHARGE MACHINING DEVICE

CROSS REFERENCE TO RELATED APPLICATIONS

This application claims the priority benefit of Japanese Patent Application No. 2019-095670, filed on May 22, 2019. The entirety of the above-mentioned patent application is hereby incorporated by reference herein and made a part of this specification.

BACKGROUND OF THE DISCLOSURE

Technical Field

The disclosure relates to a wire electrical discharge machining device.

Related Art

Conventionally, in an electrical discharge machining device of Japanese Patent No. 5783653 shown in FIG. 7, when an entry angle θ with respect to a pulley 41 is relatively small, the winding of a wire electrode WE is smoothly released by accurately tracing the path of winding in reverse. However, when a position at which the winding of the wire electrode WE is released is close to the end of a wire bobbin 25 and the entry angle θ is relatively large, the winding of the wire electrode is not smoothly released. The reason is that the wire electrode WE stretched to release the winding from the wire bobbin 25 may move to land on another location over the wire electrode WE wound at the inner side of the stretched wire electrode WE. The undesired behaviour of the wire electrode WE gives a change to the tensile force of the wire electrode WE and thus becomes the main reason to hinder the precision of the wire electrical discharge machining.

Japanese Examined Patent Publication No. 5-47333 discloses a configuration for preventing the undesired behaviour of the wire electrode WE. FIG. 8 shows a structure around a wire bobbin and a pulley of Japanese Examined Patent Publication No. 5-47333. In the figures, the same reference numerals are given to identical or similar elements to omit the description thereof. That is, in the configuration of FIG. 8, a cylindrical pulley 45 having a wire electrode winding surface extending in the axial direction is interposed in a path of the wire electrode WE from the wire bobbin 25 to a wire guide 40. Besides, a rotation shaft 43 of the cylindrical pulley 45 is also fixed to a base plate 44.

If the cylindrical pulley 45 is arranged as described above, the wire electrode WE is made to constantly move within a surface orthogonal to the rotation shaft of the wire bobbin 25 and the winding is released from the wire bobbin 25, as shown in the drawing. Accordingly, the undesired behaviour of the wire electrode WE described above is prevented.

However, in the configuration shown in FIG. 8, the wire electrode WE released from the wire bobbin 25 is sent to the wire guide 40 while the entry angle θ is changed constantly. The same applies to a case in which the cylindrical pulley 45 is not installed. Then, particularly when the wire electrode WE is released from the end of the wire bobbin 25, the wire electrode WE is sharply bent by the wire guide 40 and transmitted to the pulley 41, and thus the wire electrode WE has a risk of permanently bending.

In order to eliminate or mitigate this problem, it is also considered not to arrange the wire guide 40, but the wire electrode WE in this case directly enters the pulley 41 while the entry angle θ is changed constantly as described above. Thereby, a force for running on a V-groove of the pulley 41 acts on the wire electrode WE and the wire electrode WE may be twisted.

SUMMARY

The disclosure provides a wire electrical discharge machining device capable of sending the wire electrode released from the wire bobbin toward a wire electrical discharge machining portion without generating permanently bending or twisting.

In one embodiment, a wire electrical discharge machining device is provided, which generates electrical discharge between a workpiece and a wire electrode sent along a predetermined path and machines the workpiece. The wire electrical discharge machining device includes: a wire bobbin that feeds out the wire electrode; and a first pulley that has a groove portion for guiding the wire electrode and that is configured to receive the wire electrode fed out upward from the wire bobbin at a first reception position in the groove portion; wherein the first pulley is swingably arranged in the horizontal direction with the first delivery position as a fulcrum, and the fulcrum of the first pulley is disposed, in the width direction of the wire bobbin, within a range from one end to the other end in the width direction of the wire bobbin.

DESCRIPTION OF THE EMBODIMENTS

Figure 1:
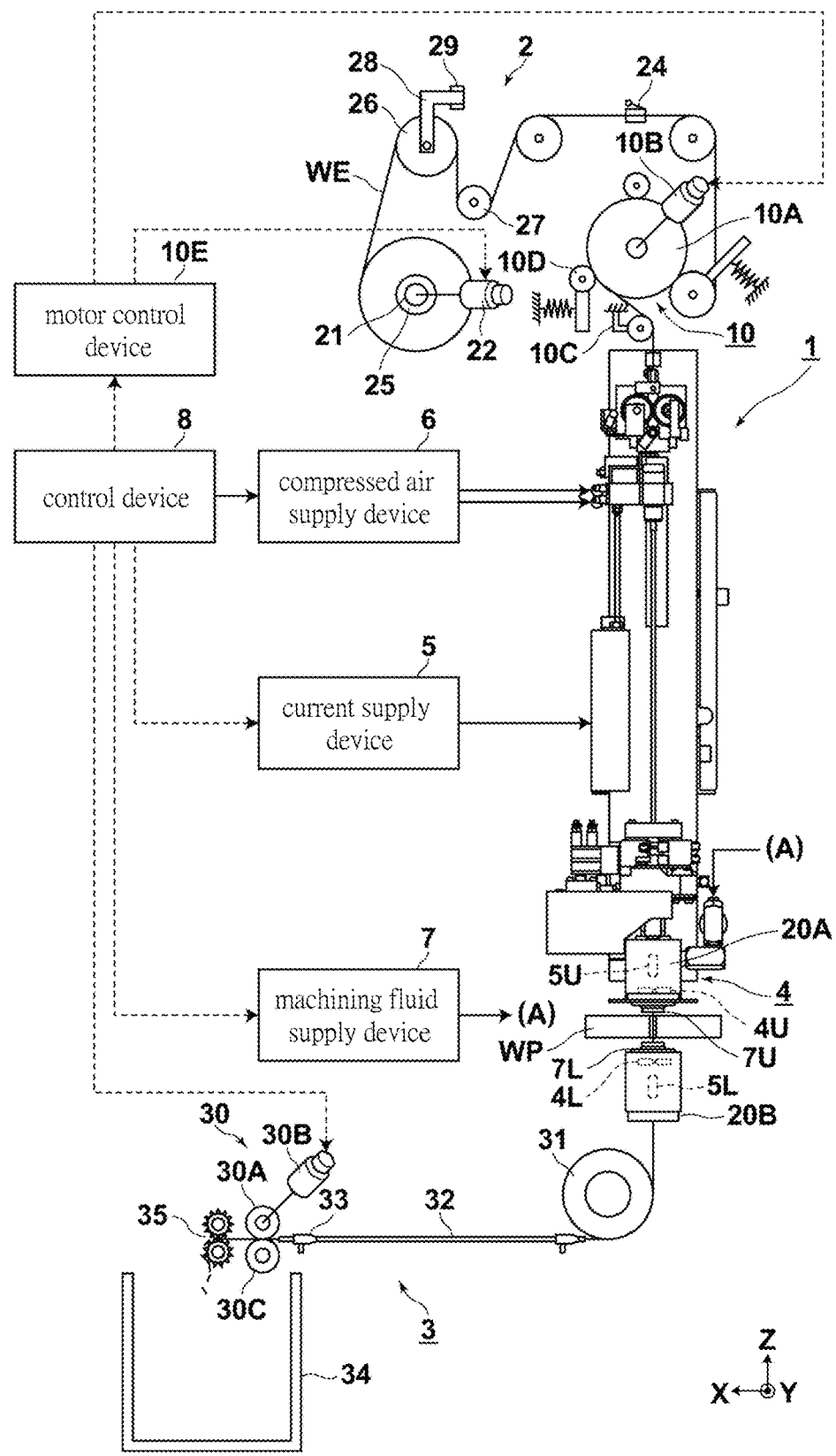
FIG. 1 is a schematic side view of a wire electrical discharge machining device of a first embodiment of the disclosure.
Figure 2:
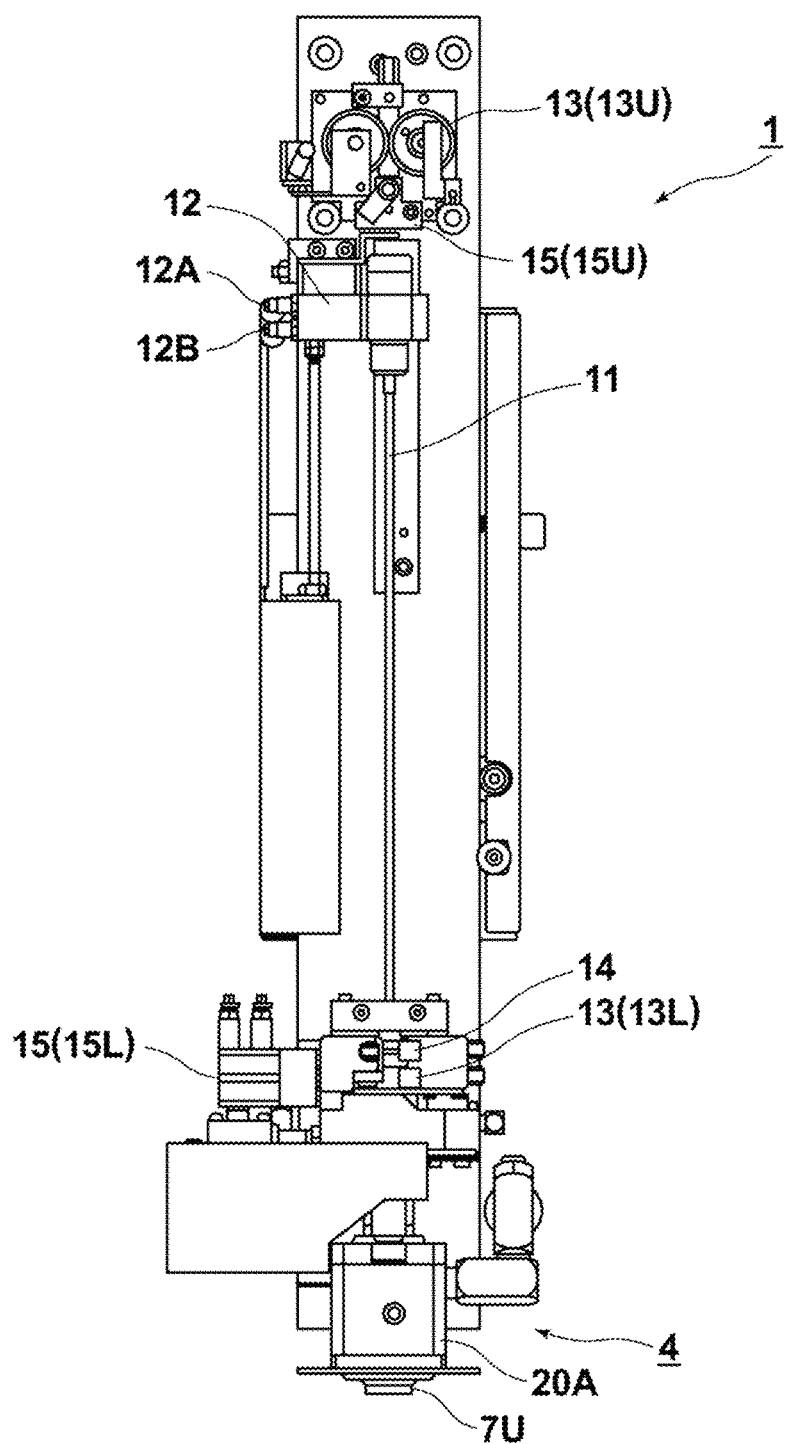
FIG. 2 is a side view showing an automatic wire threader in the wire electrical discharge machining device.

Hereinafter, embodiments of the disclosure are described with reference to the drawings. FIG. 1 shows a first embodiment of a wire electrical discharge machining device of the disclosure. In FIG. 1, in order to understand a specified travel path of a wire electrode, the wire electrical discharge machining device is schematically shown. In FIG. 1, an automatic wire threader, a wire supply mechanism, and a wire guide mechanism are shown in a front view, and a wire recovery mechanism is shown in a side view. Hereinafter, the configuration of the wire electrical discharge machining device of the embodiment is described with reference to FIGS. 1 and 2.

A wire electrode WE and a workpiece WP are disposed facing each other so that a predetermined machining gap is formed between the wire electrode WE and the workpiece WP. The wire electrode WE and the workpiece WP are moved relatively in any direction on the horizontal plane by a moving device that is not shown. A taper device that causes the wire electrode WE to be inclined to the workpiece WP is not shown.

The wire electrical discharge machining device includes an automatic wire threader 1, a wire supply mechanism 2, a wire recovery mechanism 3, a wire guide mechanism 4, a current supply device 5, a compressed air supply device 6, a machining fluid supply device 7, and a control device 8. The wire electrode WE is stretched, in a state that a predetermined tension (tensile force) is applied along a specified travel path, between a pair of wire guides 4U and 4L arranged across the workpiece WP.

The automatic wire threader 1 is configured to insert the front end of the wire electrode WE through a start hole and automatically stretches the wire electrode WE between the pair of wire guides 4U and 4L. As specifically shown in FIG. 2, the automatic wire threader 1 has at least a guide pipe 11, a wire vibrating device 12, an anneal electrode 13, an intermediate feed electrode 14, and a feed electrode driving device 15.

The guide pipe 11 is arranged substantially perpendicular to the horizontal plane along the specified travel path of the wire electrode WE. The guide pipe 11 is configured to guide the wire electrode WE from top of the automatic wire threader 1 to the upper wire guide 4U so that the wire electrode WE does not depart from the specified travel path. The guide pipe 11 reciprocates in the vertical direction by an elevating device. The guide pipe 11 moves to an upper limit position when the wire electrode WE is annealed and when the wire electrode WE is cut off. The guide pipe 11 moves to an entrance of the upper wire guide 4U that is a lower limit position when the front end of the wire electrode WE is inserted through the start hole.

The wire vibrating device 12 is arranged directly above an entrance of the guide pipe 11. The wire vibrating device 12 is configured to give tiny vibration in the vertical direction to the wire electrode WE. The wire vibrating device 12 alternately inputs compressed air of a predetermined pressure transmitted from the compressed air supply device 6 from a pair of introduction ports 12A and 12B by switching an electromagnetic valve that is not shown, and directly or indirectly applies the pressure of the compressed air to the wire electrode WE along the specified travel path. As a result, the wire electrode WE slightly moves up and down, and the wire electrode WE can be made to easily pass through the start hole.

The pair of anneal electrodes 13 includes an upper feed electrode 13U and a lower feed electrode 13L. One of the upper feed electrode 13U and the lower feed electrode 13L is connected to a positive-electrode of DC power supply of the current supply device 5, and the other one is connected to a negative-electrode. The intermediate feed electrode 14 is connected to an electrode opposite to the electrode of the DC power supply to which the lower feed electrode 13L is connected, supplies a fusing current to the wire electrode WE between the intermediate feed electrode 14 and the lower feed electrode 13L, and intentionally cuts off the wire electrode WE.

The feed electrode driving device 15 includes an upper driving device 15U and a lower driving device 15L. The upper driving device 15U has an electromagnetic actuator that opens and closes the upper feed electrode 13U consisting of a pair of rotating bodies. When being supplied with electrical power, the electromagnetic actuator urges the upper feed electrode 13U toward the wire electrode WE. The lower feed device 15L has an air cylinder or an electric cylinder. The air cylinder or the electric cylinder moves a slider in the horizontal direction and urges the lower feed electrode 13L and the intermediate feed electrode 14 fixed to the slider toward the wire electrode WE.

The wire supply mechanism 2 is configured to continuously supply a new wire electrode WE which has not been used for machining to a machining gap along the specified travel path. The wire supply mechanism 2 includes a tension device 10. The wire supply mechanism 2 mainly has a reel 21, a brake device 22, a first pulley 26, a second pulley 27, and a delivery roller 10A automatically rotating by a delivery motor 10B. In addition, in the wire supply mechanism 2, a disconnection detector 24 such as a limit switch and a tensile force detector 10C such as a strain-gauge are arranged.

Each rotating body of the wire supply mechanism 2 including the reel 21, the first pulley 26, the second pulley 27, and the delivery roller 10A is a guide that guides the traveling wire electrode WE along the specified travel path. In the following description, the rotating direction of each rotating body when delivering the wire electrode WE is set as a forward direction, and the direction opposite to the forward direction is set as a reverse direction.

The wire bobbin 25 that stores the wire electrode WE is rotatably attached to the reel 21. The brake device 22 adds a required torque in the reverse direction of the reel 21 loaded with the wire bobbin 25, and applies a back tension to the wire electrode WE. The brake device 22 avoids idling of the wire bobbin 25 and prevents loosening of the wire electrode WE in the wire supply mechanism 2.

Specifically, the brake device 22 is, for example, a brake motor such as a hysteresis motor or an electromagnetic brake such as an electromagnetic clutch. When the brake device 22 is the brake motor, the brake motor can be operated in synchronization with the delivery motor 10B. When the brake device 22 is the electromagnetic brake, the electromagnetic brake is configured to obtain a brake force by a friction force of the electromagnetic clutch, and the electromagnetic brake is controlled independently of the delivery motor 10B. However, the electromagnetic brake can control, by the control device 8, the timing and the brake force for operating the electromagnetic brake, and thus the electromagnetic brake can be operated according to the operating timing of each device of the automatic wire threader 1.

The wire electrode WE fed out from the wire bobbin 25 is wound around the first pulley 26 and the second pulley 27 and then sent to the delivery roller 10A described later. Besides, the first pulley 26 is rotatably held by a swing arm 28. The swing arm 28 is held by a swing shaft 29. Besides, as the first pulley 26 and the second pulley 27, for example, V-groove pulleys are used in which a groove portion that winds and holds the wire electrode WE in the outer peripheral portion is formed.

The tension device 10 is configured to apply a predetermined tension (tensile force) to the wire electrode WE, that is, a tensile force device. The tension device 10 is included in the wire supply mechanism 2. The tension device 10 mainly includes the delivery roller 10A, the delivery motor 10B, the tensile force detector 10C, a pinch roller 10D, and a motor control device 10E.

The delivery roller 10A automatically rotates by the delivery motor 10B. The delivery roller 10A obtains a driving force for moving the wire electrode WE by the pinch roller 10D pressing the wire electrode WE to the outer peripheral surface of the delivery roller 10A. The delivery roller 10A smoothly travels without disconnecting the wire electrode WE in a manner of not loosening the wire electrode WE by a plurality of rollers including the pinch roller 10D.

The delivery motor 10B is a servo motor. The delivery motor 10B is controlled through the motor control device 10E according to a command signal of the control device 8. The delivery motor 10B servo-operates by the motor control device 10E based on a detection signal of the tensile force detector 10C. Therefore, the tension of the wire electrode WE is stable even when a set tensile force value is small, and a risk that the wire electrode WE is loosened or disconnected is smaller. The control device 8 can control the delivery motor 10B according to a torque in a winding device 30 of the wire recovery mechanism 3.

When the wire electrode WE is stretched between a pair of wire guides 4U and 4L, the delivery roller 10A applies a predetermined tension to the wire electrode WE according to a rotation speed difference between the delivery roller 10A and a winding roller 30A of the winding device 30. Specifically, in a state that the wire electrode WE is substantially stopped or while the wire electrode WE is continuously delivered to the machining gap at a predetermined travel speed, the predetermined tension is applied to the wire electrode WE.

During the threading operation of the wire electrode WE, the delivery roller 10A is rotated at a constant speed in the forward direction by the delivery motor 10B, inserts the front end of the wire electrode WE through the start hole, and make the wire recovery mechanism 3 capture the wire electrode WE. In addition, when retry of automatic wire threading operation is performed, the delivery roller 10A is rotated at a constant speed in the reverse direction by the delivery motor 10B and winds the wire electrode WE to a predetermined position.

The wire recovery mechanism 3 is configured to recover the wire electrode WE that has been used for machining and consumed from the machining gap along the specified travel path. The wire recovery mechanism 3 has the winding device 30, a roller (pulley) 31 for direction conversion, a transfer pipe 32, an aspirator 33, a bucket 34, and a wire cutter 35. The winding device 30 mainly includes a winding roller 30A, a winding motor 30B, and a pinch roller 30C. The winding roller 30A constitutes a driving roller of the winding device 30, and the pinch roller 30C constitutes a driven roller of the winding device 30.

The wire electrode WE passing by the lower wire guide 4L through the start hole changes the advancing direction to the horizontal direction by the roller 31, and is inserted into the transfer pipe 32. The wire electrode WE in the transfer pipe 32 is sucked by the aspirator 33 and obtains a propulsion force.

The wire electrode WE getting out of the transfer pipe 32 is captured and clamped between the winding roller 30A and the pinch roller 30C of the winding device 30. The winding roller 30A is rotated at a predetermined rotation speed in the forward direction by the winding motor 30B which is a constant-speed rotation motor, and draws the used wire electrode WE to the position directly above the bucket 34 while causing the used wire electrode WE to travel at a predetermined travel speed. In the wire electrical discharge machining device of the embodiment, the wire electrode WE drawn above the bucket 34 is shredded by the wire cutter 35 and accommodated in the bucket 34.

The wire guide mechanism 4 includes an upper wire guide 4U and a lower wire guide 4L being a pair arranged across the workpiece WP. The upper wire guide 4U and the lower wire guide 4L are respectively incorporated into an upper guide assembly 20A and a lower guide assembly 20B. The pair of wire guides 4U and 4L positions the wire electrode WE in the specified travel path and guides the traveling wire electrode WE. Both of the pair of wire guides 4U and 4L are "die guides" having a die shape. Because there is a clearance of several micrometers between each of the wire guides 4U and 4L and the wire electrode WE, the front end of the wire electrode WE can be made to pass through the wire guides 4U and 4L during the automatic wire threading operation.

In the upper guide assembly 20A and the lower guide assembly 20B, an upper conductor 5U and a lower conductor 5L for supplying a machining current from the current supply device 5 to the wire electrode WE are respectively accommodated. In addition, an upper nozzle 8U and a lower nozzle 8L for injecting and supplying a machining fluid jet having a predetermined pressure supplied from the machining fluid supply device 7 to the machining gap are respectively incorporated into the upper guide assembly 20A and the lower guide assembly 20B.

The current supply device 5 includes at least a DC current, a switching circuit, and a relay switch. In the wire electrical discharge machining device of the embodiment, the current supply device 5 includes a machining power supply circuit that supplies a machining current to the machining gap. Accordingly, the current supply device 5 is configured to apply a voltage pulse necessary for electrical discharge to the machining gap to supply the machining current, and is configured to supply a predetermined anneal current and a predetermined fusing current to the wire electrode WE during the automatic wire threading operation.

The positive electrode of the DC current of the current supply device 5 is connected to the upper conductor 5U and the lower conductor 5L respectively accommodated in the upper guide assembly 20A and the lower guide assembly 20B, and the negative electrode is connected to the workpiece WP. During the machining, the current supply device 5 repeatedly applies the voltage pulse to the machining gap through the upper conductor 5U, the lower conductor 5L and the workpiece WP, and intermittently supplies the predetermined machining current to the machining gap. The workpiece WP is loaded on, for example, an unillustrated XY moving stage and is moved in the horizontal two-axial direction (X and Y directions) along with the application of the voltage pulse, thereby being machined into a predetermined shape on the X-Y plane. Besides, the part where the workpiece WP is machined in this manner is referred to as a "wire electrical discharge machining portion".

In the current supply device 5 of the embodiment, the positive electrode of the DC current is respectively connected to the upper feed electrode 13U and the intermediate feed electrode 14 of the automatic wire threader 1 via an unillustrated relay switch, and the negative electrode is connected to the lower feed electrode 13L via an unillustrated relay switch. During the automatic wire threading operation, the current supply device 5 conducts the pair of anneal electrodes 13 and supplies a predetermined anneal current to the wire electrode WE. In addition, when intentionally cutting off the wire electrode WE, the current supply device 5 conducts the lower feed electrode 13L and the intermediate feed electrode 14, and supplies a predetermined fusing current to the wire electrode WE.

The compressed air supply device 6 is configured to supply compressed air for operation to the wire vibrating device 12 of the automatic wire threader 1. The compressed air supply device 6 includes a compressed air supply source such as an unillustrated air compressor, a plurality of electromagnetic valves, and a regulator. The compressed air supply device 6 adjusts high-pressure compressed air of the compressed air supply source to a predetermined pressure by the regulator and periodically switches the electromagnetic valves, thereby alternately supplying the compressed air having a predetermined pressure to a pair of introduction ports 12A and 12B of the wire vibrating device 12.

The machining fluid supply device 7 is configured to supply the machining fluid jet having a predetermined pressure to the machining gap. The machining fluid supply device 7 supplies, by an unillustrated jet pump, a clean machining fluid accumulated in a service tank to an upper machining fluid jet nozzle 7U and a lower machining fluid jet nozzle 7L respectively arranged in the upper guide assembly 20A and the lower guide assembly 20B. Thereby, the machining fluid jet having a predetermined pressure is injected from each of the machining fluid jet nozzles 7U and 7L toward the machining gap coaxially with an axial line direction of the specified travel path of the wire electrode WE. Besides, in FIG. 1, the path of the machining fluid from the machining fluid supply device 7 to the wire guide mechanism 4 is omitted in the middle, but the display part (A) of the path getting out of the machining fluid supply device 7 is coupled to the display part (A) of a path entering the wire guide mechanism 4.

The control device 8 is configured to control the operation of the wire electrical discharge machining device. Hereinafter, main control among the control operations of the control device 8 is described. In the wire electrical discharge machining device of the embodiment, the control device 8 controls the operation of the automatic wire threader 1. The control device 8 particularly controls the current supply device 5 and the tension device 10.

The control device 8 controls the tension device 10 to set the tensile force value as small as possible within a range of 80 g or less to apply a tension to the wire electrode WE during a predetermined period in which a predetermined anneal current is supplied from the current supply device 5. The control device 8 particularly controls the automatic wire threader 1 so that the wire electrode WE is exposed to the air and gradually cooled without heating during a predetermined period while the supply of the predetermined anneal current is stopped.

The control device 8 controls the current supply device 5 so as to supply the predetermined anneal current to the wire electrode WE, when a predetermined period has elapsed after a tension which the set tensile force value is sufficiently small is applied to the wire electrode WE. In addition, the control device 8 controls the tension device 10 so that the set tensile force value is reduced by 10 g or larger in a range that the set tensile force value is not 0 g while the predetermined anneal current is stopped. The control device 8 performs control to apply a tension to the wire electrode WE so that the set tensile force value returns to the original set tensile force value after a predetermined period has elapsed.

Figure 3:
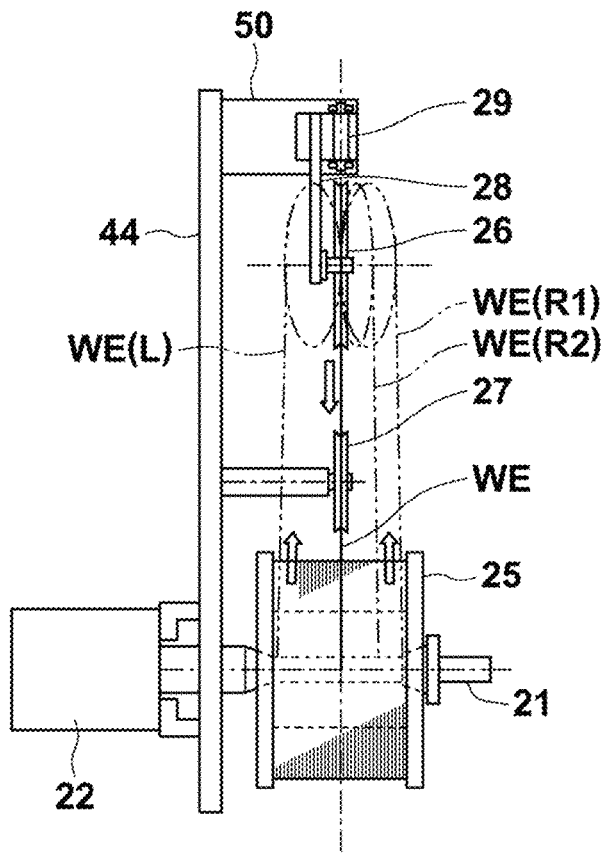
FIG. 3 is a front view showing a main portion of the wire electrical discharge machining device.
Figure 4:
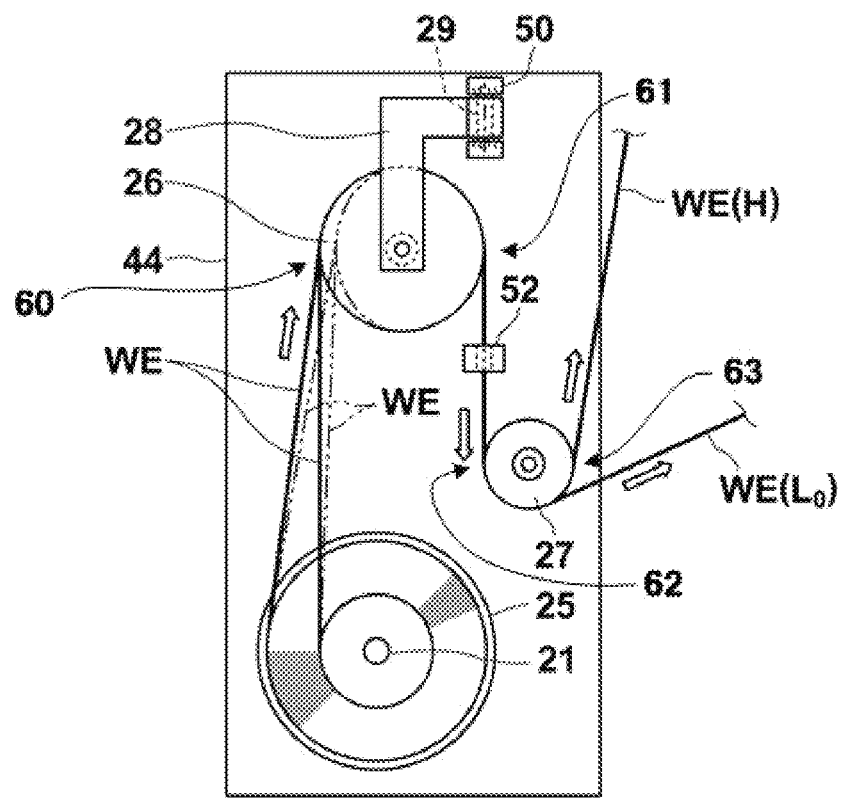
FIG. 4 is a side view of the main portion shown in FIG. 3.
Figure 5:
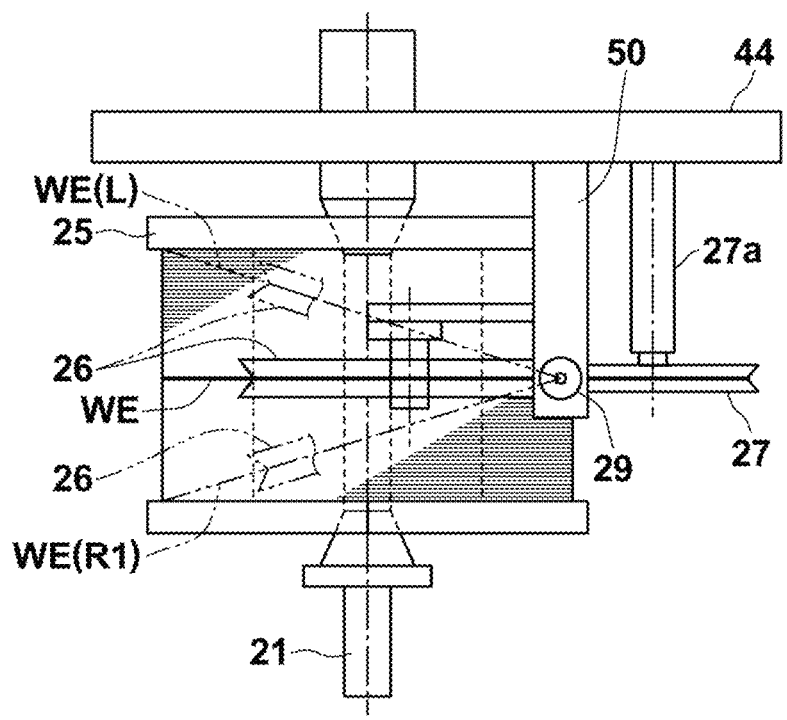
FIG. 5 is a plan view of the main portion shown in FIG. 3.

Next, a configuration for transmitting the wire electrode WE released from the wire bobbin 25 to the wire electrical discharge machining portion without generating permanently bending or twisting is described with reference to FIGS. 3-6. FIG. 3 is a front view, FIG. 4 is a side view, and FIG. 5 is a plan view, each of them showing a peripheral structure of the first pulley 26 and the second pulley 27 shown in FIG. 1. As shown in FIGS. 3-5, the wire electrode WE is fed out upward from the wire bobbin 25. The first pulley 26 that receives the wire electrode WE fed out from the wire bobbin 25 is held by the swing arm 28. The swing arm 28 is held by the swing shaft 29 extending in the vertical direction and is swingable in the horizontal direction with the swing shaft 29 as a fulcrum. The swing shaft 29 is held by a holding member 50 fixed to the base plate 44. In other words, it is desirable to include the swing arm 28 which holds the first pulley 26 to be rotatable, and the swing shaft 29 which is arranged vertically to the first delivery position 61 and to which the swing arm 28 is attached.

Hereinafter, the swing may also be treated as "swing using the swing shaft 29 as a fulcrum" for the sake of convenience. The first pulley 26 held by the swing arm 28 swings, along with the swinging of the swing arm 28, in the horizontal direction with the swing shaft 29 as a fulcrum. The wire electrode WE wound around the first pulley 26 is delivered downward.

More specifically, as shown in FIG. 4, the swing shaft 29 is disposed at a position the same as the position of one point of the outer peripheral portion of the first pulley 26 on the XY plane. The first pulley 26 receives the wire electrode WE fed out from the wire bobbin 25 at a predetermined position of the outer peripheral portion opposite to the fulcrum across a central portion in a radial direction of the first pulley 26. Besides, the position of the outer peripheral portion of the first pulley 26 receiving the wire electrode WE is referred to as a first reception position 60. In addition, the first pulley 26 winds the wire electrode WE to a predetermined position of the outer peripheral portion opposite to the first reception position 60 across the central portion in the radial direction of the first pulley 26. Besides, the position of the outer peripheral portion of the first pulley 26 from which the wire electrode WE is delivered is referred to as a first delivery position 61.

In addition, as shown in FIGS. 3 and 5, the swing shaft 29 serving as the swing fulcrum of the first pulley 26 (more specifically, a vertical shaft at the center of the swing shaft 29) is disposed, in the width direction of the wire bobbin 25, within a range from one end to the other end in the width direction of the wire bobbin 25. Particularly in the embodiment, the vertical shaft at the center of the swing shaft 29 is disposed, in the width direction of the wire bobbin 25, in the central portion from one end to the other end in the width direction of the wire bobbin 25.

Here, the first reception position 60 in the first pulley 26 is disposed, when viewed from the width direction of the wire bobbin 25, on the vertical line of the feed-out position of the wire electrode WE of the wire bobbin 25, or closer to the first delivery position 61 than the feed-out position. In FIG. 4, positions of the wire electrode WE when the winding diameter of the wire electrode WE in the wire bobbin 25 is the maximum and the minimum are shown. In the latter case, the first reception position 60 is disposed on the vertical line of the feed-out position of the wire electrode WE of the wire bobbin 25. In addition, when the winding diameter of the wire electrode WE in the wire bobbin 25 is larger than the minimum winding diameter, the first reception position 60 is disposed closer to the first delivery position 61 than the feed-out position of the wire electrode WE from the wire bobbin 25.

The wire electrode WE delivered downward from the first pulley 26 is wound around the lower part of the second pulley 27. That is, the second pulley 27 is disposed to receive the wire electrode WE delivered downward from the first pulley 26 at a predetermined position of the outer peripheral portion. Besides, the position of the outer peripheral portion of the second pulley 27 receiving the wire electrode WE is referred to as a second reception position 62. In addition, the second pulley 27 winds the wire electrode WE to a predetermined position of the outer peripheral portion opposite to the second reception position 62 across a central portion in a radial direction of the second pulley 27, and delivers the wire electrode WE upward. Besides, the position of the outer peripheral portion of the second pulley 27 from which the wire electrode WE is delivered in this manner is referred to as a second delivery position 63.

Figure 6:
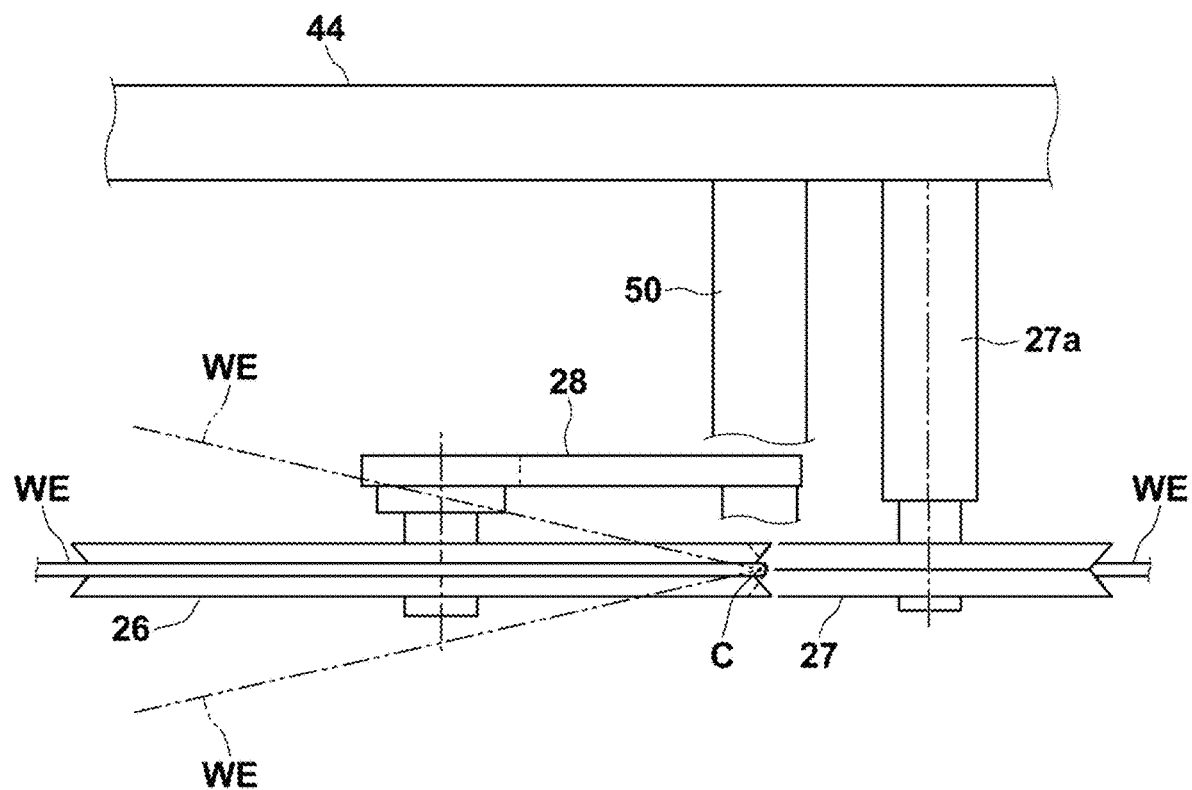
FIG. 6 is an enlarged plan view of a part of the main portion shown in FIG. 5.
Figure 7:
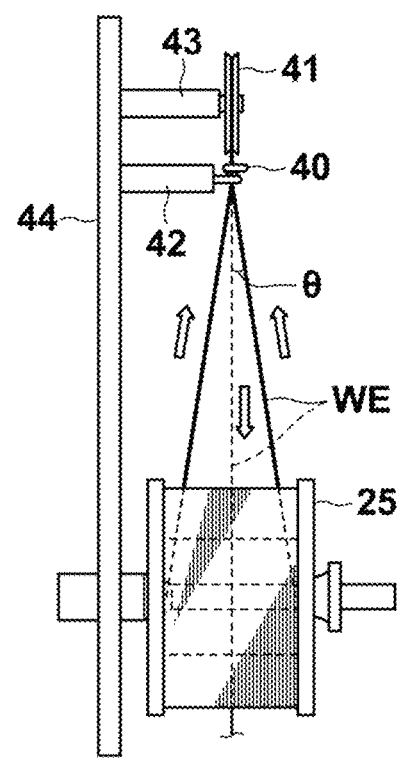
FIG. 7 is a schematic view illustrating a problem in a conventional wire electrical discharge machining device.
Figure 8:
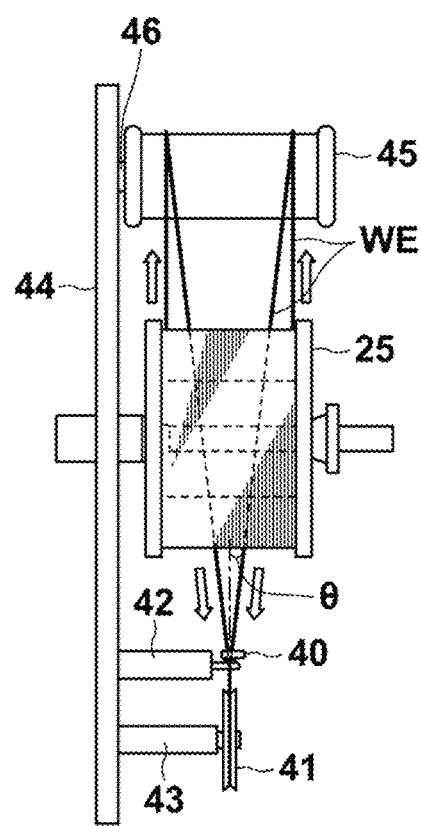
FIG. 8 is a schematic view illustrating another problem in the conventional wire electrical discharge machining device.

The second reception position 62 of the second pulley 27 is disposed directly below the first delivery position 61 of the first pulley 26. In other words, between the first delivery position 61 and the second reception position 62, the wire electrode WE extends in the vertical direction. The second pulley 27 is held by a supporting portion 27a fixed to the base plate 44. FIG. 6 is a view in which a peripheral portion of the first pulley 26 and the second pulley 27 is viewed from above. Accordingly, in FIG. 6 the wire electrode WE substantially extending in the vertical direction extends perpendicular to the paper plane with the center of the wire electrode WE shown as C.

Hereinafter, the operation of the configuration shown in FIGS. 3-6 is described. The feed-out position of the wire electrode WE is sequentially displaced so as to reciprocate between one end and the other end in the width direction of the wire bobbin 25. In FIGS. 3 and 5, the wire electrode WE fed out from the central portion in the width direction of the wire bobbin 25 is shown by a solid line. The path of the wire electrode WE fed out from the central portion in the width direction of the wire bobbin 25 and wound around the first pulley 26 and the second pulley 27 exists on one surface perpendicular to the axial direction of the wire bobbin 25 (the left-right direction in FIG. 3 and the vertical direction in FIG. 5).

In addition, in FIGS. 3 and 5, the wire electrode WE fed out from the outermost end position in the width direction of the wire bobbin 25 is shown by a two-dot chain line, the wire electrode fed out from the left end position in FIG. 3 is shown as WE (L), and the wire electrode fed out from the right end position in FIG. 3 is shown as WE (R1). Furthermore, the wire electrode fed out from a position somewhat closer to the central portion in the width direction of the wire bobbin 25 than the right end position is shown as WE (R2).

As described above, the tensile force is applied to the wire electrode WE fed out from the wire bobbin 25 by the operation of the tension device 10. Therefore, when the feed-out position of the wire electrode WE is displaced from the central portion in the width direction of the wire bobbin 25 to the end side, the first pulley 26 around which the wire electrode WE is wound swings with the swing shaft 29 as a fulcrum, and the first reception position 60 swings on the swing shaft 29. In other words, a force acts which causes the first pulley 26 to swing in a manner that the path of the wire electrode WE wound around the first pulley 26 is the shortest. In FIGS. 3 and 4, the first pulley 26 swinging corresponding to the position displacement of the wire electrode WE is schematically represented by an ellipse of the two-dot chain line.

As described above, in the embodiment, the first pulley 26 is configured to be capable of swinging in the horizontal direction with the swing shaft 29 as a fulcrum. In addition, the first reception position 60 is disposed, when viewed from the width direction of the wire bobbin 25, on the vertical line of the feed-out position of the wire electrode WE from the wire bobbin 25 or closer to the first delivery position than the feed-out position. Furthermore, the vertical shaft at the center of the swing shaft 29 is disposed, in the width direction of the wire bobbin 25, in the central portion of the range from one end to the other end in the width direction of the wire bobbin 25. Accordingly, the path of the wire electrode WE from the wire bobbin 25 to the second pulley 27 exists on one surface, and thus the generation of permanently bending or twisting on the wire electrode WE is prevented in the path. At the same time, change in the tensile force acting on the wire electrode WE is also prevented.

In addition, as previously described with reference to FIG. 6, the second reception position 62 is disposed directly below the first delivery position 61. Since the first delivery position 61 and swing shaft 29 is arranged along a vertical direction, the first delivery position is immovable even if the first pulley 26 swings. Therefore, even if the path of the wire electrode WE changes along with the swinging of the first pulley 26, the second pulley 27 receives the wire electrode WE at the fixed second reception position 62. Accordingly, the second pulley 27 always stably winds the wire electrode WE and then delivers the wire electrode WE to the downstream side.

In addition, if a disconnection detector 52 of the wire electrode WE is arranged, as shown in FIG. 4, it is preferable to arrange the disconnection detector 52 in the wire electrode path between the first pulley 26 and the second pulley 27. When the first delivery position 61 and the swing shaft 29 is arranged along the vertical direction, in this path, the position of the wire electrode WE is not changed even if the first pulley 26 swings, and thus the disconnection detection is easily and precisely performed.

Besides, in a case of the wire electrical discharge machining device having a configuration in which a machining head equipped with various members from the downstream side of the second pulley 27 up to the tension device 10 can move up and down, the path of the wire electrode WE from the second pulley 27 changes corresponding to the height of the machining head. In FIG. 4, the wire electrode paths when the machining head is located relatively upward and relatively downward are respectively shown as WE (H) and WE (Lo). The wound range of the wire electrode WE in the second pulley 27 changes corresponding to the height of the machining head.

Other Configurations

In one embodiment, a wire electrical discharge machining device is provided, which generates electrical discharge between a workpiece and a wire electrode sent along a predetermined path and machines the workpiece. The wire electrical discharge machining device includes: a wire bobbin that feeds out the wire electrode; and a first pulley that has a groove portion for guiding the wire electrode and that is configured to receive the wire electrode fed out upward from the wire bobbin at a first reception position in the groove portion; wherein the first pulley is swingably arranged in the horizontal direction with the first delivery position as a fulcrum, and the fulcrum of the first pulley is disposed, in the width direction of the wire bobbin, within a range from one end to the other end in the width direction of the wire bobbin.

Besides, the first reception position is desirably disposed, when viewed from the width direction of the wire bobbin, on a vertical line of the feed-out position of the wire bobbin that feeds out the wire electrode, or disposed closer to the first delivery position than the feed-out position.

In addition, the swing fulcrum of the first pulley is desirably disposed, in the width direction of the wire bobbin, in a central portion between one end and the other end in the width direction of the wire bobbin.

In addition, the wire electrical discharge machining device of the disclosure desirably further includes a second pulley that receives, at a second reception position of an outer peripheral portion, the wire electrode delivered from the swing pulley, and winds the wire electrode to the second delivery position disposed on the outer peripheral portion opposite to the second reception position across a central portion in a radial direction and delivers the wire electrode upward; wherein the second pulley is disposed so that the second reception position is directly below the first delivery position.

In addition, in the wire electrical discharge machining device of the disclosure, desirably, a groove portion that winds and holds the wire electrode is formed in the outer peripheral portion of the first pulley or the second pulley.

According to the wire electrical discharge machining device of the disclosure, the first pulley is arranged. The first pulley is swingably arranged in the horizontal direction with one end in the radial direction as a fulcrum, receives the wire electrode fed out from the wire bobbin at the first reception position of the outer peripheral portion opposite to the fulcrum across the central portion in the radial direction, winds the wire electrode to the first delivery position of the outer peripheral portion opposite to the first reception position across the central portion in the radial direction and delivers the wire electrode downward. Besides, the swing fulcrum of the first pulley is disposed, in the width direction of the wire bobbin, within the range from one end to the other end in the width direction of the wire bobbin. Therefore, even if the wire electrode is brought to the first pulley while changing the entry angle as described above, the first pulley swings to follow the change in the entry angle, and the wire electrode wound on the first pulley can be delivered to the downstream side without generating permanently bending or twisting.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A wire electrical discharge machining device, which generates electrical discharge between a workpiece and a wire electrode sent along a predetermined path and machines the workpiece, comprising:
    a wire bobbin that feeds out the wire electrode;
    a first pulley that has a groove portion for guiding the wire electrode and is configured to receive the wire electrode fed out upward from the wire bobbin at a first reception position in the groove portion;
    a swing arm that holds the first pulley to be rotatable; and
    a shaft which is arranged vertically to a first delivery position and to which the swing arm is attached, wherein the first delivery position is in the groove portion and opposite to the first reception position,
    wherein the first pulley is swingably arranged in a horizontal direction with the first delivery position as a fulcrum, and
    the fulcrum of the first pulley is disposed, in a width direction of the wire bobbin, within a range from one end to the other end in the width direction of the wire bobbin.

2. The wire electrical discharge machining device according to claim 1, wherein the first reception position is disposed, when viewed from the width direction of the wire bobbin, on a vertical line of a feed-out position of the wire bobbin that feeds out the wire electrode, or disposed closer to the first delivery position than the feed-out position.

3. The wire electrical discharge machining device according to claim 1, wherein the fulcrum of the first pulley is disposed, in the width direction of the wire bobbin, in a central portion between the one end and the other end in the width direction of the wire bobbin.

4. The wire electrical discharge machining device according to claim 1, further comprising a second pulley receiving, at a second reception position of an outer peripheral portion, the wire electrode delivered from the first pulley, winding the wire electrode to a second delivery position disposed on the outer peripheral portion opposite to the second reception position across a central portion in a radial direction, and delivering the wire electrode upward,
    wherein the second pulley is disposed so that the second reception position is directly below the first delivery position.

5. The wire electrical discharge machining device according to claim 4, wherein a groove portion that winds and holds the wire electrode is formed in the outer peripheral portion of the second pulley.

* * * * *